United States Patent [19]
Loader

[11] Patent Number: 5,566,334
[45] Date of Patent: Oct. 15, 1996

[54] METHOD FOR PROCESSING INTERRUPT REQUESTS IN A COMPUTER SYSTEM OPERATING ENVIRONMENT HAVING DIFFERENT TYPES OF SUPERVISOR PROGRAMS CONCERNED WITH SPECIFIED TYPES OF INTERRUPT EVENTS

[75] Inventor: David B. Loader, Sugar Land, Tex.

[73] Assignee: BMC Software, Inc., Houston, Tex.

[21] Appl. No.: 435,081

[22] Filed: May 4, 1995

Related U.S. Application Data

[63] Continuation of Ser. No. 200,849, Feb. 22, 1994, abandoned, which is a continuation of Ser. No. 62,436, Jun. 12, 1987, abandoned.

[51] Int. Cl.⁶ .................................................. G06F 13/24
[52] U.S. Cl. ........................ 395/650; 395/739; 395/742; 364/DIG. 1; 364/241.2; 364/242.1
[58] Field of Search .................................... 395/700, 650, 395/739, 742

[56] References Cited

U.S. PATENT DOCUMENTS

| | | | |
|---|---|---|---|
| 4,257,096 | 3/1981 | McCullough et al. | 364/200 |
| 4,456,970 | 6/1984 | Catiller et al. | 364/900 |
| 4,475,156 | 10/1984 | Federico et al. | 364/300 |
| 4,736,318 | 4/1988 | Delyani et al. | 364/200 |
| 4,779,187 | 10/1988 | Letwin | 364/200 |

*Primary Examiner*—Kevin A. Kriess

[57] ABSTRACT

A transport mechanism system and method, implemented in software, that permits the coordinated supervision, by an arbitrary number of SUPERVISOR PROGRAMS, of the execution of indirect-addressed interrupt-handling routines in an operating system. The transport mechanism intercepts each call to a supervised interrupt handler, creates a MEMORY MODEL of the then-existing environment, and hands control in sequence to the SUPERVISOR PROGRAMs. Each SUPERVISOR PROGRAM can examine the MEMORY MODEL as well as modify it, and can call a transport mechanism service routine which results in turn in the calling of the normal interrupt-handling routine, but now in the context of the environment specified by the MEMORY MODEL. Such execution is followed by return of control to the calling SUPERVISOR PROGRAM. After all called SUPERVISOR PROGRAMs have completed their execution and returned control to the transport mechanism, the transport mechanism conforms the actual environment to that indicated by the MEMORY MODEL. If no SUPERVISOR PROGRAM has called for execution of the called interrupt, the transport mechanism does so. The transport mechanism then returns control to the program which originally initiated the interrupt event.

3 Claims, 10 Drawing Sheets

Interception by Transport Mechanism of User Program Interrupt Initiation

TYPICAL INDIRECT-ADDRESSED INTERRUPT PROGRAM FLOW (UNSUPERVISED)

Interception by Transport Mechanism
of User Program Interrupt Initiation

TM53
Simplified representative programming of typical SUPERVISOR PROGRAM with "Interrupt Executed" flag ON

METHOD FOR PROCESSING INTERRUPT REQUESTS IN A COMPUTER SYSTEM OPERATING ENVIRONMENT HAVING DIFFERENT TYPES OF SUPERVISOR PROGRAMS CONCERNED WITH SPECIFIED TYPES OF INTERRUPT EVENTS

This application is a continuation of application Ser. No. 08/200,849, filed 22 Feb. 1994, entitled "System and Method for Managing Multiple Supervisor Programs in a Computer System Operating Environment," which is itself a continuation of application Ser. No. 07/062,436, filed 12 Jun. 1987 now both abandoned.

BACKGROUND OF THE INVENTION

This invention relates to a system and method for the distributed supervision (including the selective modification) of an interrupt-responsive operating system of a programmable digital computer.

Operating Systems

Operating systems typically consist of sophisticated computer programs that include sets of instructions, commonly referred to in the generic sense as routines, for handling most of the actual control of a computer's hardware. Many operating system routines are written to be callable by other programs. In other words, generally speaking, an appropriate instruction within such a calling program causes an operating-system routine to be executed, in effect as though the operating-system routine were an integral part of the calling program itself.

The use of such routines can reduce the complexity of and the time required to write other programs. For example, a program designer who wants to read data from a storage device can utilize a call to an existing operating system routine for that purpose, thereby avoiding the need to write such a routine anew.

Interrupts

An interrupt may be broadly defined as an event that causes the computer to cease its present operation and, among other things, to execute one or more predetermined interrupt-handling (IH) routines stored in addressable storage such as random-access memory (RAM) or virtual memory. Many computers are responsive to hardware interrupts, while some computers may provide (either alternatively or additionally) for software interrupts.

A typical use of interrupts is to request operating system services by calling specific operating system routines. For example, a user program might use an interrupt to cause the computer to execute a routine that results in making a particular storage device available to the user program.

For flexibility purposes, part of the processing of interrupts is commonly handled using an indirect addressing approach. The computer is commonly programmed (sometimes in software, sometimes in microcode) to consult a table, or other block of formatted information, of addresses for IH routines as part of its response to the occurrence of an interrupt event. Each such address is commonly referred to as a "vector" and the table of vectors as a "vector table."

Each entry in such an IH vector table provides the address (i.e., the specific location in addressable storage) of an IH routine for a particular type of interrupt. In other words, the various IH vector table entries serve as pointers to the IH routines to be executed upon the occurrence of various types of interrupt.

SUMMARY OF THE INVENTION

The present invention relates to a system and method, implemented in software, that permits the coordinated supervision, by an arbitrary number of SUPERVISOR PROGRAMs, of the execution of indirect-addressed interrupt-handling routines in an operating system. The term "Transport Mechanism" is used for convenience to refer generally to a system and method in accordance with the invention, and is additionally used to avoid confusion with the widespread use of the term "system" to signify the computer system rather than any particular program operating on the computer system.

In brief, the Transport Mechanism intercepts each call to a supervised interrupt handler, creates a MEMORY MODEL of the then-existing environment, and hands control in sequence to the SUPERVISOR PROGRAMs. The term "environment" is used herein to refer collectively to the various registers and other locations (e.g., particular blocks in RAM memory) used by the computer's operating system in executing programs.

Each SUPERVISOR PROGRAM can examine the MEMORY MODEL as well as modify it. As will be seen, when this capability is exercised by a SUPERVISORY PROGRAM, the execution of the called interrupt is eventually altered in a manner transparent to the calling program.

A SUPERVISOR PROGRAM can call a Transport Mechanism service routine which results in turn in the calling of the normal IH routine, but now in the context of the environment specified by the MEMORY MODEL (which may have been changed by a SUPERVISOR PROGRAM). Such execution is followed by return of control to the SUPERVISOR PROGRAM. In effect, this permits each SUPERVISOR calling PROGRAM to examine the environment that would be expected to exist both before and after the execution of the normal IH routine, by examining "before" and "after" environments of that routine as initiated by the Transport Mechanism.

The Transport Mechanism implements, in the actual environment, any alterations ordered by the SUPERVISOR PROGRAM(s): after all called SUPERVISOR PROGRAMs have completed their execution and returned control to the Transport Mechanism, the Transport Mechanism conforms the actual environment to that indicated by the MEMORY MODEL. If no SUPERVISOR PROGRAM has called for execution of the called interrupt, the Transport Mechanism does so.

The Transport Mechanism then returns control to the program which originally initiated the interrupt event, as though the interrupt event had been executed normally without intervention by the Transport Mechanism. The post-execution state of the environment, however, may have been significantly changed from what would have originally been expected, through the interaction of the SUPERVISOR PROGRAM(s) with the Transport Mechanism. The Transport Mechanism thus provides distributed supervision in a manner transparent to the user program.

BRIEF DESCRIPTION OF THE DRAWINGS

Throughout the following detailed description, similar reference numerals refer to similar elements in all Figures of the drawings.

DETAILED DESCRIPTION

Figure 1:
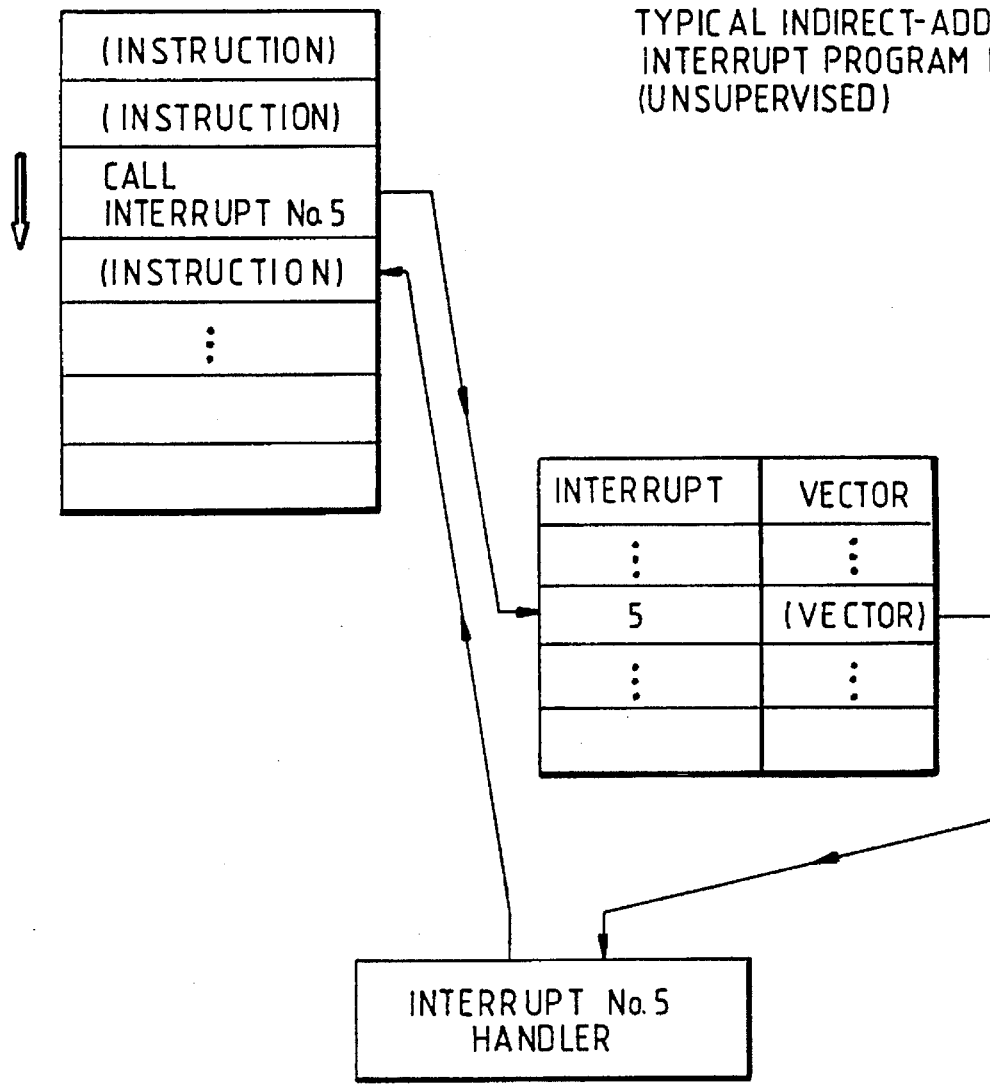
FIG. 1 is a simplified block diagram representation of program control flow for an unsupervised type of interrupt.
Figure 2:
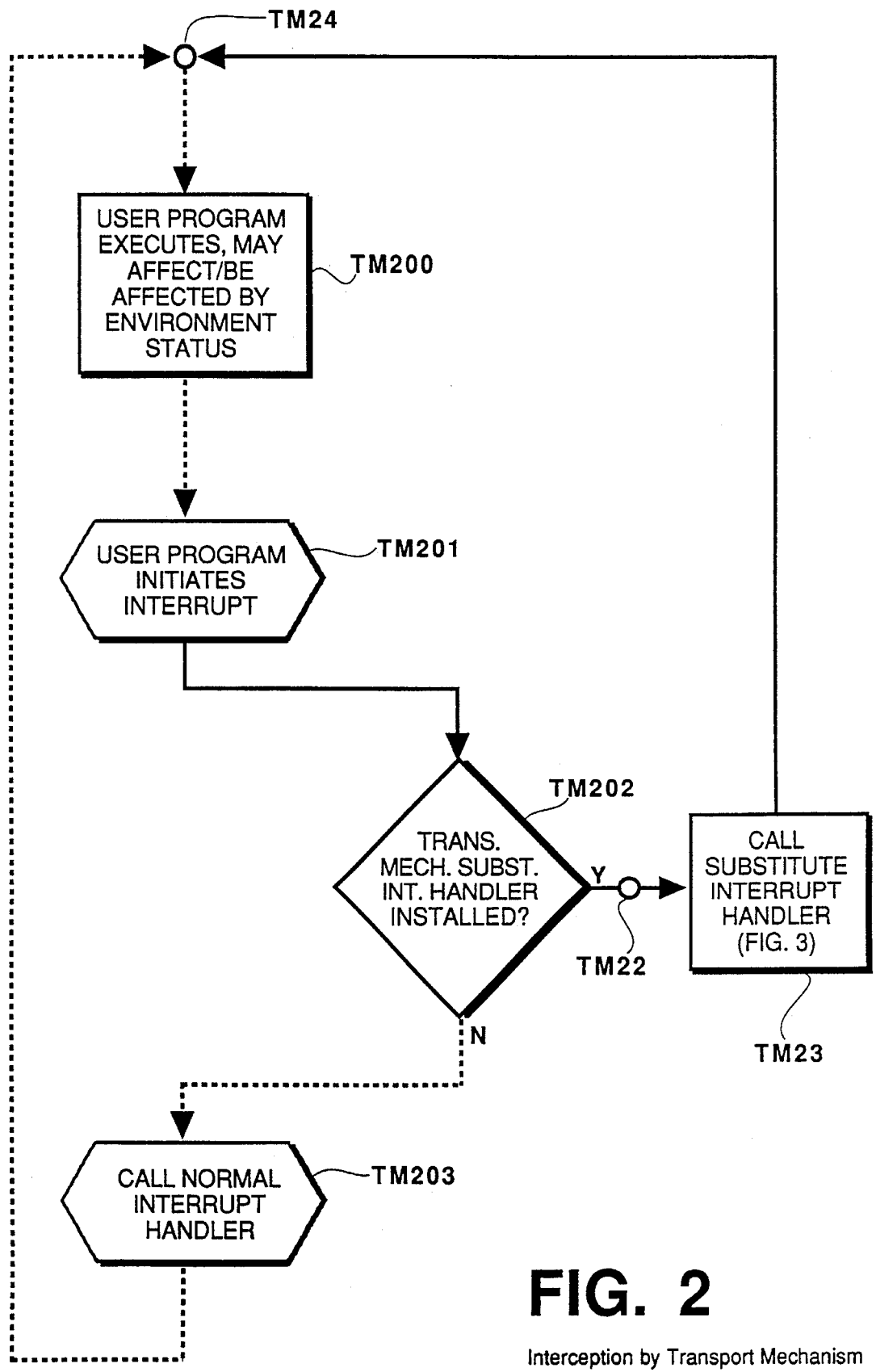
FIG. 2 is a flow-chart logical representation of a user program's call to the SUBSTITUTE INTERRUPT HANDLER in connection with the initiation of a supervised interrupt event.

The following detailed description pertains to the common logical structure of implementation of the Transport Mechanism on an arbitrary computer system, shown generally in FIG. 2. It will be recognized by those skilled in the art that the details of specific preferred implementation techniques will vary considerably depending on the type of computer and operating system, among other factors.

SUPERVISOR PROGRAM Installation

Figure 9:
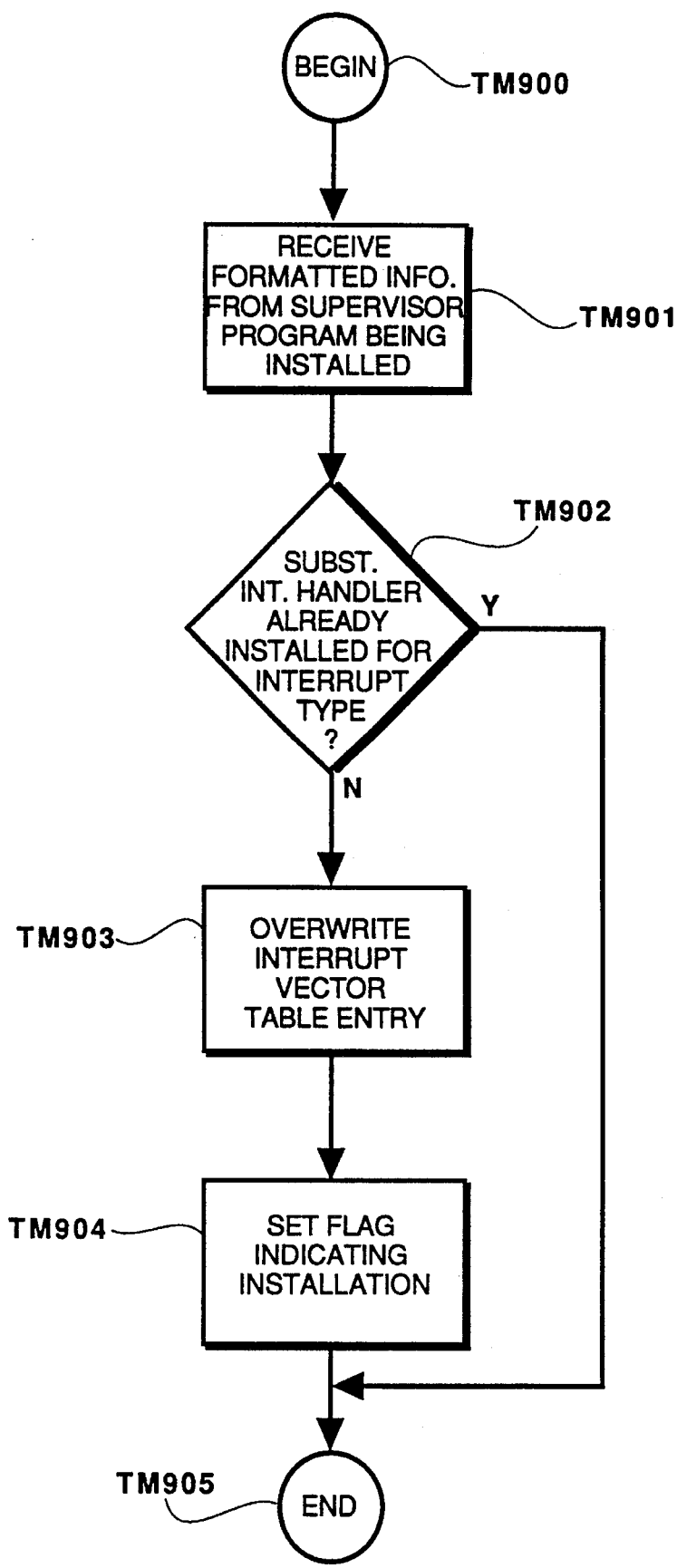
FIG. 9 is a flow-chart block diagram of a routine for installing SUPERVISOR PROGRAMs in a queue for calling by the DISPATCHER routine.

As shown in FIG. 9, a SUPERVISOR PROGRAM installation routine, callable by a SUPERVISOR PROGRAM upon its initial operation, causes SUPERVISOR-PROGRAM status information to be written by the Transport Mechanism to a formatted block of addressable storage such as RAM. This information block concerns the active SUPERVISOR PROGRAMs that are present in the computer's operating environment and intended to participate in the Transport Mechanism's distributed supervision.

Such information preferably includes information concerning which specific types of interrupt events would be processed by any given SUPERVISOR PROGRAM, and which types would be ignored thereby.

SUBSTITUTE IH Installation Routine

Figure 3:
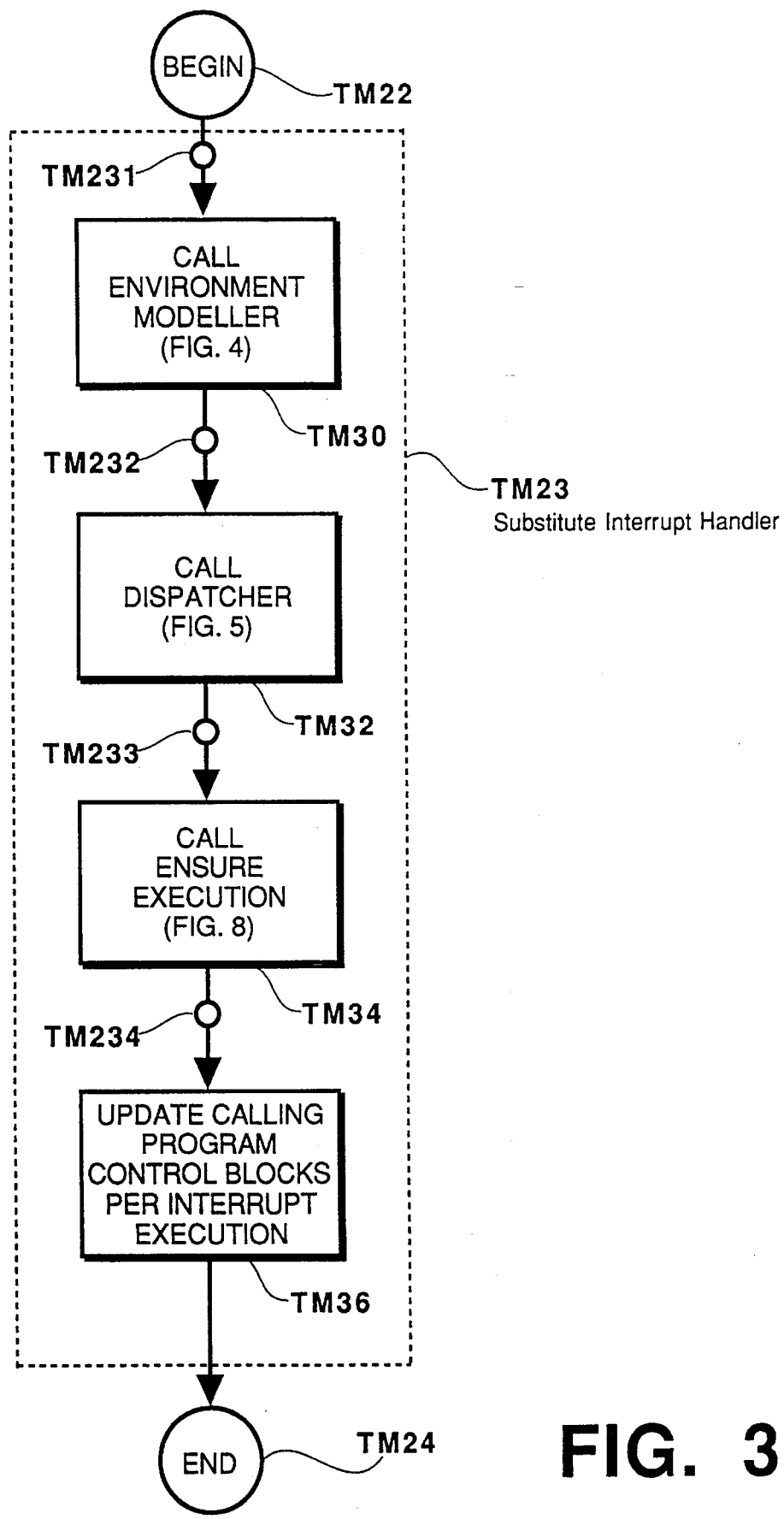
FIGS. 3, 4, 5, 6A, 6B, 7 and 8 are flow-chart block diagrams of component routines within the SUBSTITUTE INTERRUPT HANDLER.

As shown in FIG. 3, a SUBSTITUTE IH installation routine causes the address of a SUBSTITUTE IH routine to be written over the entry in the IH address table for each type of interrupt to be supervised. As a result, any program call to a supervised interrupt results in the SUBSTITUTE IH routine being executed instead of the operating system's normal IH routine. The Transport Mechanism copies the address of the normal IH routine for future use in actually executing a supervised interrupt.

The programming of the SUBSTITUTE IH routine must of course take into account the environment-status processing that will be required for the type of interrupt to be intercepted. Depending on programmer preference, the interrupt vector table entry can be overwritten with the address of a single "shell" substitute IH routine which branches to other subroutines as necessary, or with the address of a substitute IH routine selected as needed for the particular type of interrupt.

A SUBSTITUTE IH is preferably installed only when the SUPERVISOR PROGRAM status information indicates that the interrupt in question would be processed by one or more active SUPERVISOR PROGRAMs. Thus, an interrupt of a type that would be ignored by all SUPERVISOR PROGRAMs would not have its normal IH vector overwritten; its normal IH routine would consequently be executed when called instead of being blocked by the Transport Mechanism. This helps minimize the changes made by the Transport Mechanism to the computer's operating environment.

Calling of ENVIRONMENT MODELLER Routine

Figure 4:
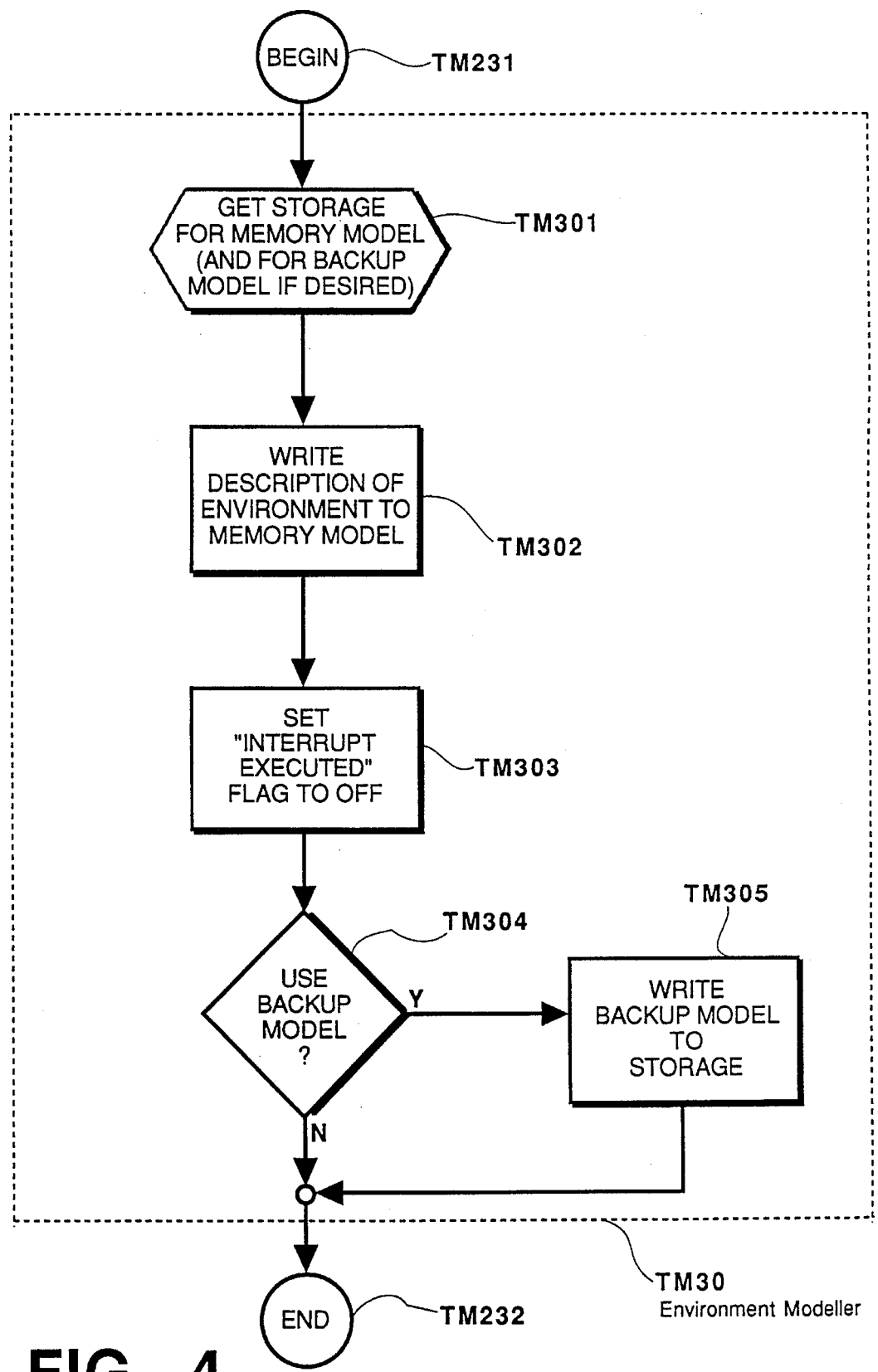

As seen in FIG. 4, whenever the SUBSTITUTE IH routine is called (as a result of initiation of a supervised interrupt event, e.g., by a user program), a ENVIRONMENT MODELLER routine is called in turn. The ENVIRONMENT MODELLER routine writes out environment-status information to the MEMORY MODEL in a predetermined format (and to a BACKUP MODEL if used) for future reference by the SUPERVISOR PROGRAMs and by the Transport Mechanism itself.

The environment status information written out by the ENVIRONMENT MODELLER routine includes a flag indicating whether or not the operating system's normal IH routine has actually been executed, as discussed below. For convenience, this flag may be a memory cell at an arbitrary specific offset within the MEMORY MODEL. This flag will of course initially be turned off because the normal IH routine will not have been executed.

Calling of DISPATCHER Routine

Figure 5:
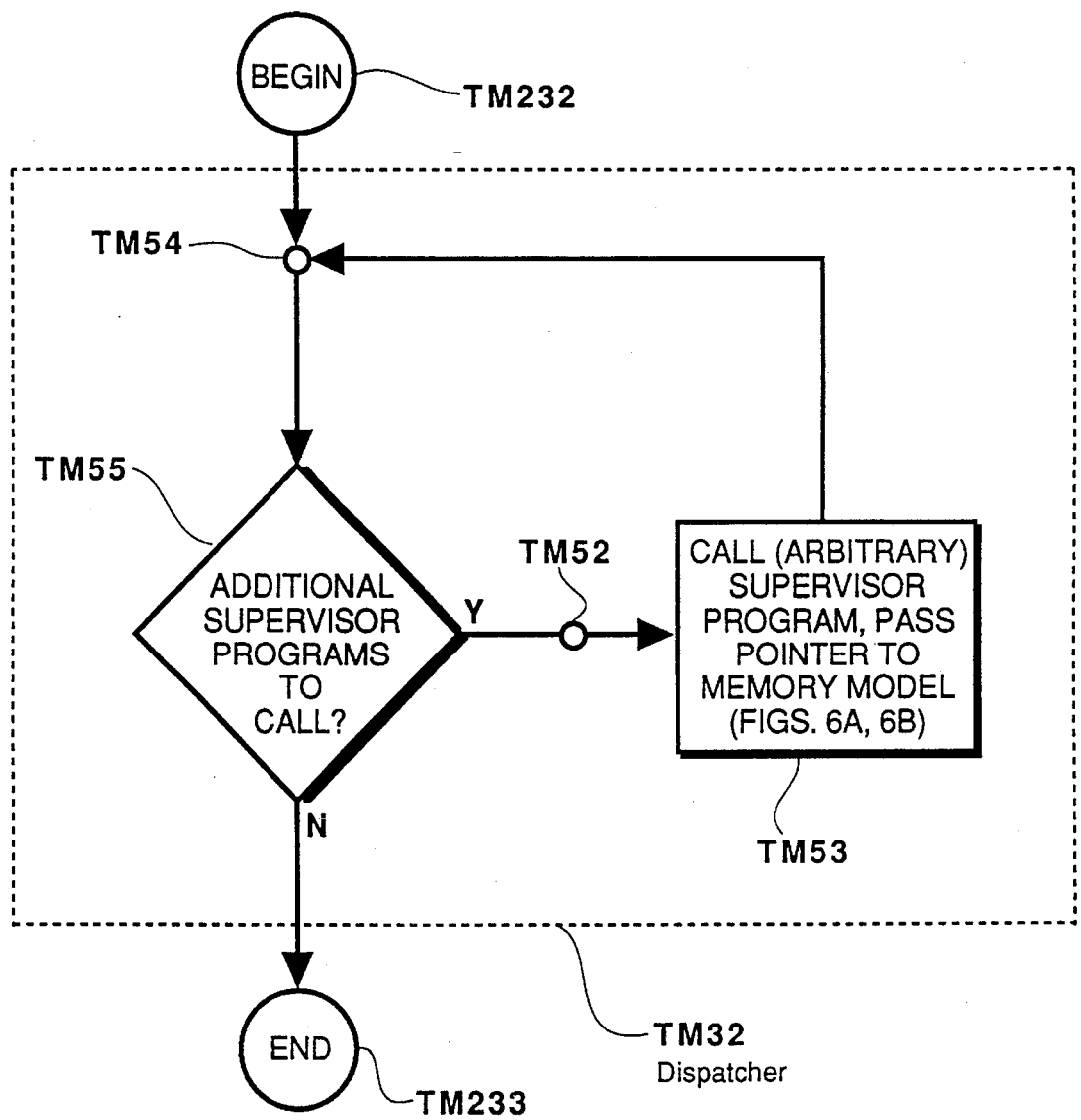

As illustrated in FIG. 5, continuing with the Transport Mechanism's response to a supervised interrupt initiation, a DISPATCHER routine is called subsequent to the ENVIRONMENT MODELLER routine. The DISPATCHER routine sequentially calls one or more of the SUPERVISOR PROGRAMs in a list of active SUPERVISOR PROGRAMs, passing to each called SUPERVISOR PROGRAM, as an argument, the address of the formatted environment-status information block.

In many implementations it will be desirable that in returning control to the DISPATCHER routine, each SUPERVISOR PROGRAM return any outstanding operating-system error codes as arguments, or simply the fact that such an error is outstanding. It will also be desirable for the DISPATCHER routine to maintain a flag indicating whether any such return has been made. Such a return indicates that the SUPERVISOR PROGRAM's error-handling facilities failed to cope with an error. As discussed below, the Transport Mechanism's ENSURE EXECUTION routine can be designed to take this possibility into account.

Calling of INTERRUPT EXECUTION Routine

Figure 6A:
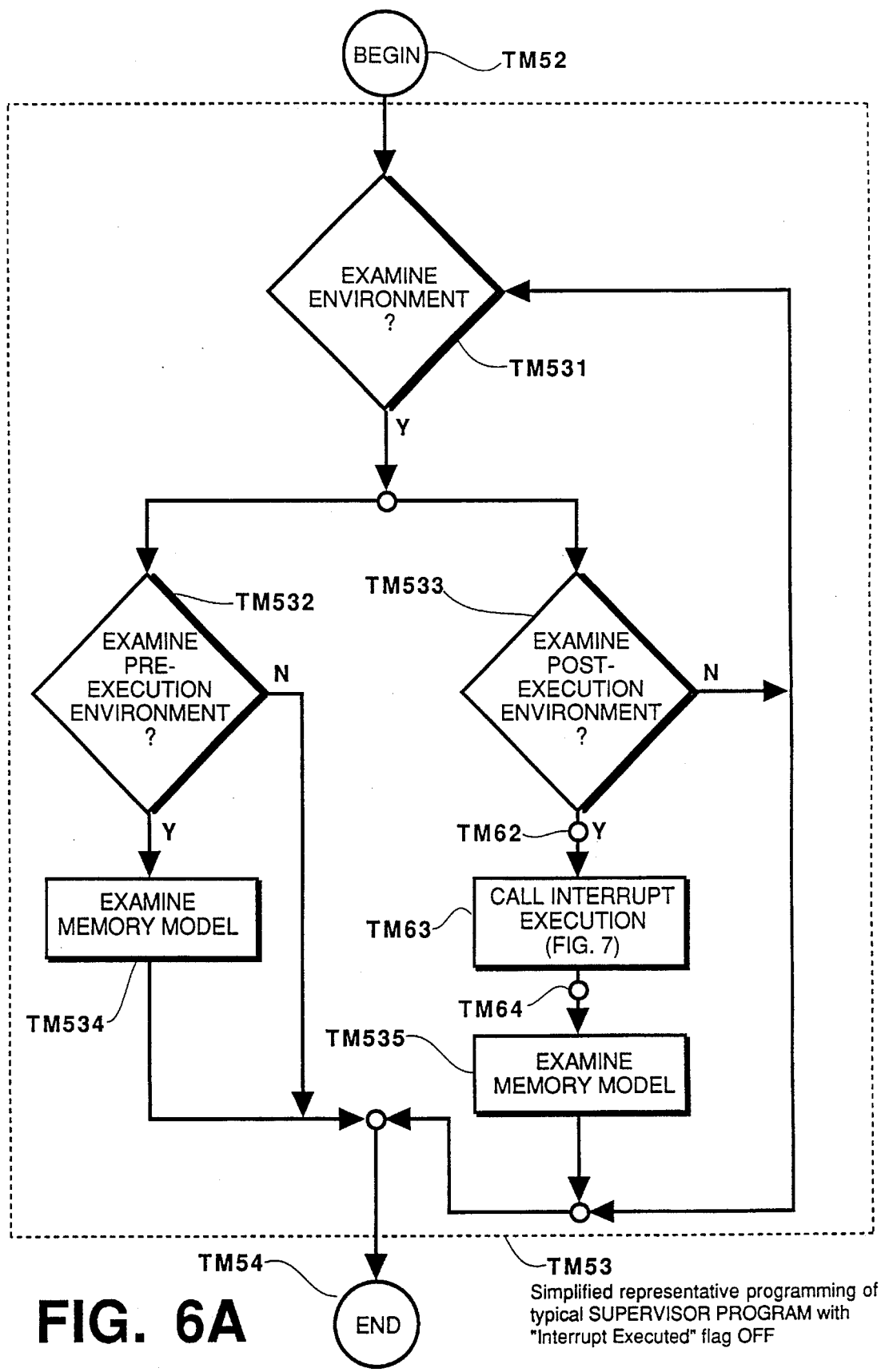
Figure 6B:
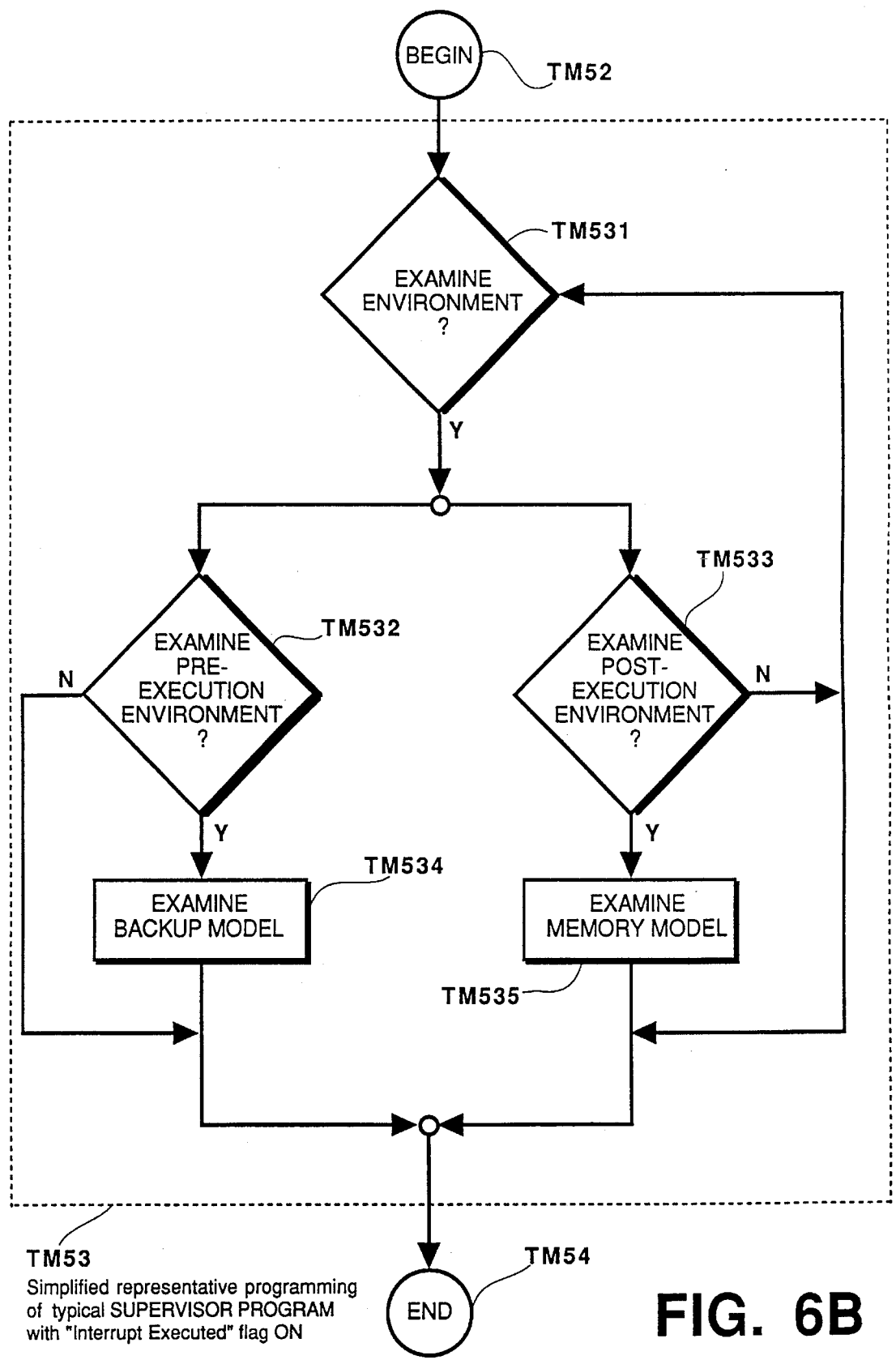

As shown in FIGS. 6A and 6B, a SUPERVISOR PROGRAM may include a decision branch calling for an examination of the environment that would be expected to exist after execution of the called interrupt. To this end, an INTERRUPT EXECUTION service routine is provided, for possible calling by a SUPERVISOR PROGRAM, to duplicate the effect of the called interrupt.

Figure 7:
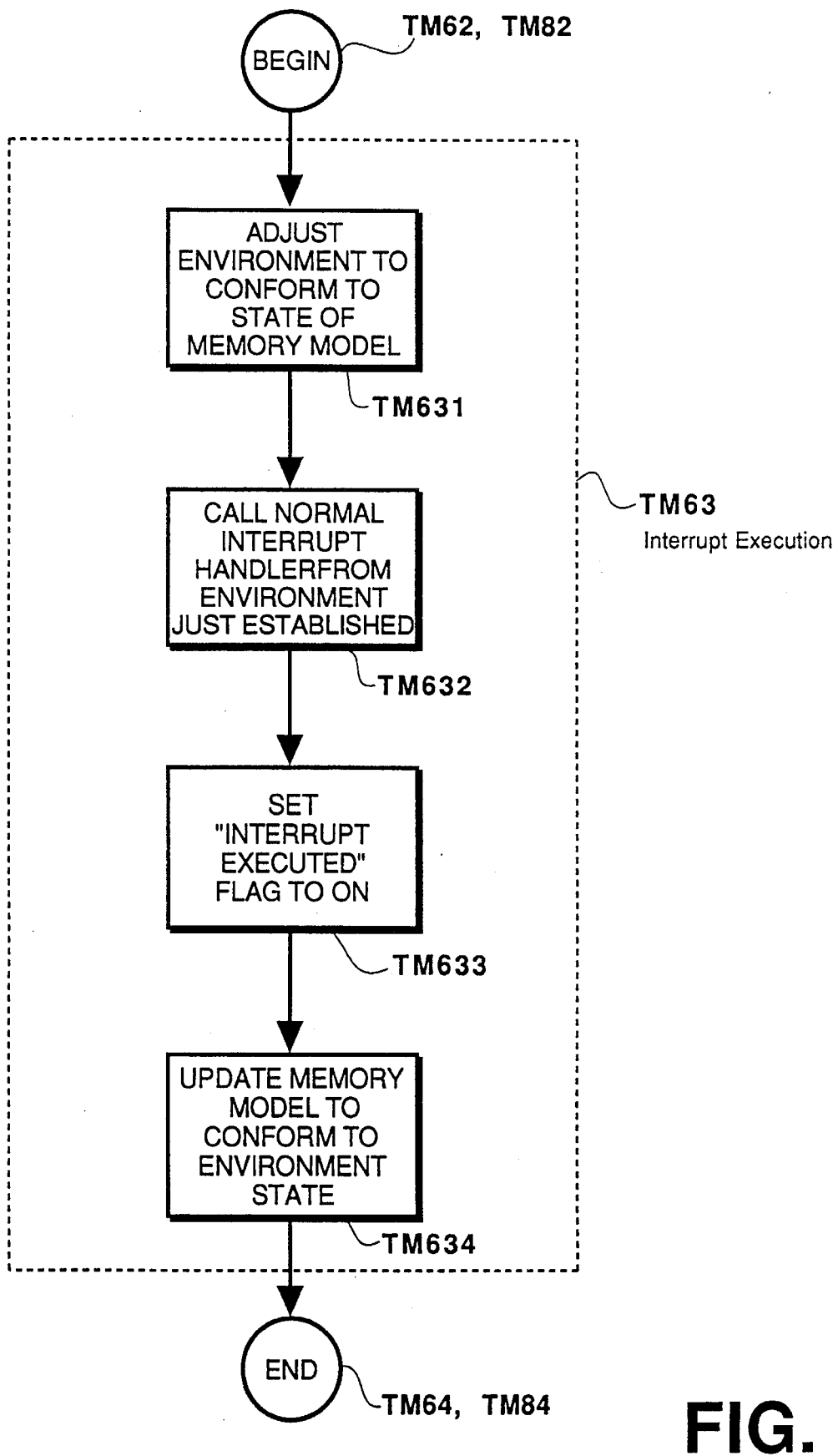

As illustrated in FIG. 7, the INTERRUPT EXECUTION routine leads to the following results, in the order stated: (a) the conforming of the computer's environment to the state represented by the MEMORY MODEL, which may have been altered by the SUPERVISOR PROGRAM; (b) the calling of the operating system's normal IH routine; (c) the updating of the MEMORY MODEL to reflect the post-execution environment; (d) the setting of the aforementioned flag in the MEMORY MODEL to indicate that the interrupt has been executed; and (e) the return of control to the calling SUPERVISOR PROGRAM.

It would of course be possible to provide other Transport Mechanism service routines by which a SUPERVISOR PROGRAM could carry out any desired manipulation of the MEMORY MODEL, so that such manipulation would not need to be done directly by the SUPERVISOR PROGRAM. Whether such a feature would be desirable in any particular implementation would depend on factors such as the complexity of the parameters which must be manipulated in connection with the supervised interrupts, the extent to which manipulation of the MEMORY MODEL is expected to be called for, and the need to control access to the MEMORY MODEL for integrity purposes.

Pre- and Post-Execution MEMORY MODEL Processing

It will be apparent to those of skill in the art having the benefit of this disclosure that the programming of a SUPERVISOR PROGRAM may include instructions for examining or manipulating both the pre-execution and post-execution environment status information in the MEMORY MODEL, since control is handed back to a calling SUPERVISOR PROGRAM after calling of the normal IH routine by the Transport Mechanism.

However, by the time a particular SUPERVISOR PROGRAM is given control by the Transport Mechanism, the normal IH routine may already have been executed. Against such a possibility (signified by the "Interrupt Executed" flag in the MEMORY MODEL), the SUPERVISOR PROGRAM may be designed to consult the BACKUP MODEL (or the operating system control blocks if the BACKUP MODEL is not implemented) for information about the pre-execution environment status.

In a related vein, a particular SUPERVISOR PROGRAM may be designed to require access to a post-execution environment in which the pre-execution environment was unchanged from the time of the interrupt initiation by the user program. Against such a possibility, it is desirable to organize the list or queue of SUPERVISOR PROGRAMs called by the DISPATCHER routine into priority classes, with "passive" SUPERVISOR PROGRAMs being called first. A SUPERVISOR PROGRAM requiring a look at an unchanged, pre-execution environment model could thus queue up in the earliest priority class.

Alternatively, a SUPERVISOR PROGRAM can be designed to make a backup copy of the MEMORY MODEL; restore the MEMORY MODEL to the unchanged pre-execution state using information from the BACKUP MODEL (or the operating system control blocks); call the INTERRUPT EXECUTION routine; perform whatever additional processing is desired; and restore the MEMORY MODEL to the state in which the SUPERVISOR PROGRAM found it, before handing control back to the DISPATCHER routine. However, this would likely require considerably more programming for a SUPERVISOR PROGRAM than the early-queueing approach described above, and furthermore would increase the risk of MEMORY MODEL corruption.

Calling of ENSURE EXECUTION Routine

Figure 8:
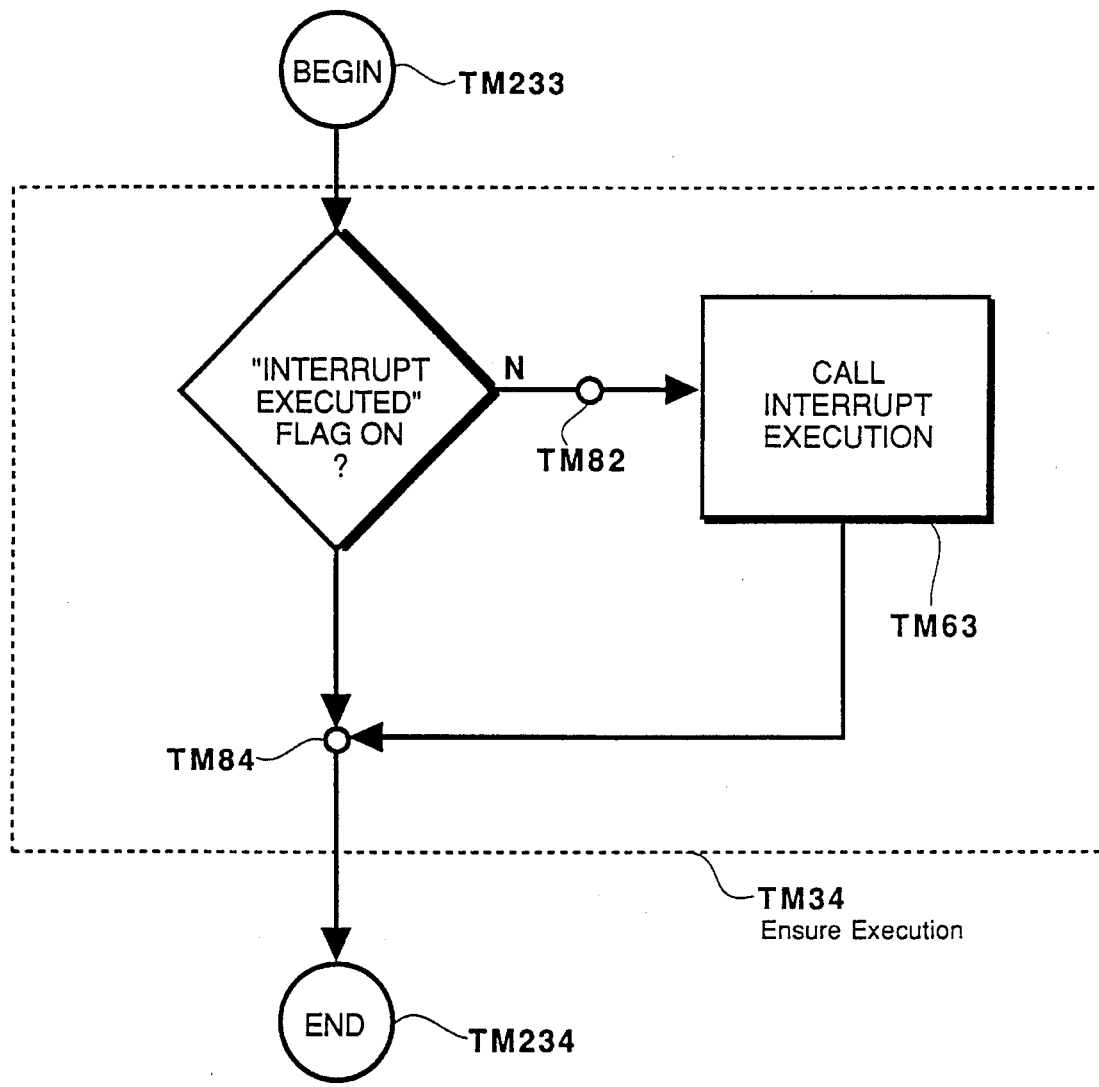

As shown in FIG. 8, after all SUPERVISOR PROGRAMs have been polled by the Transport Mechanism's DISPATCHER routine, the Transport Mechanism's ENSURE EXECUTION routine checks the MEMORY MODEL flag to determine whether calling of the normal IH routine was ordered by any SUPERVISOR PROGRAM. If not, the ENSURE EXECUTION routine calls the INTERRUPT EXECUTION routine in the manner described above.

As a safety feature, the ENSURE EXECUTION can be programmed to check the flag indicating whether any SUPERVISOR PROGRAM returned an error code as discussed above. One way of handling such an event would be to use the BACKUP MODEL information (or other control block states) to restore the MEMORY MODEL to its state prior to the calling of the DISPATCHER routine, then to call the INTERRUPT EXECUTION routine. In effect, this would cancel out all action taken by the SUPERVISOR PROGRAMs and cause execution of the normal IH routine as though the supervised interrupt had never been intercepted.

Following the ENSURE EXECUTION routine, the Transport Mechanism writes to the user program's control blocks (generated by the operating system upon the user program's initiation of the first interrupt) to indicate that the interrupt was executed. Control is then returned to the user program. The operations of the Transport Mechanism and the various SUPERVISOR PROGRAMs are thus transparent to the user program.

MVS Illustrative Implementation

As a convenient illustration, a particular implementation is described herein, relating to a computer operating under IBM's widely-used MVS multiprogramming operating system. The design and method of operation of the MVS operating system are extensively documented in a number of publications available from IBM Corporation, Programming Publications, Department D58, Building 706-2, P.O. Box 390, Poughkeepsie, N.Y. 12602.

SVC Interrupt Events

The interrupts of interest in the illustrative MVS implementation are referred to in MVS documentation as supervisor calls (SVCs). The MVS operating system maintains a vector table of interrupt handling routine addresses associated with the SVCs (the SVCTABLE), and additionally provides an SVCUPDTE function that permits the overwriting of the IH vector table entry for any given SVC. The overwriting procedure is described in detail at pages 2-386 et seq. of "SPL: System Macros and Facilities Volume 2" published by IBM.

SubSystem Interface (SSI)

In the illustrative MVS implementation, use can be made of that system's SubSystem Interface (SSI). The MVS operating system permits programs conforming to certain protocol requirements to be installed as subsystems that act, in effect, as resident extensions to the operating system. Examples of typical subsystems include printing spoolers such as JES2 and JES3.

The SSI does not play a principal role in the illustrative MVS implementation. However, it does provide a convenient and widely-known standard architechture and method by which subsystems or other programs can interface with other subsystems.

Generally speaking, any program making use of the SSI must do so by creating a pair of control blocks in addressable storage and writing formatted information to them. These standard control blocks are a subsystem information block (SSIB) and a corresponding subsystem option block (SSOB). The SSIB identifies the program which is using the SSI to invoke the target subsystem. The SSOB contains a pointer to the address in addressable storage of a parameter list in standard format, known as an extension block. This indirect-addressing technique reflected in the SSOB permits a program to utilize the SSI to pass an arbitrary number of parameters to a subsystem using a fixed-size SSOB.

MVS Transport Mechanism Installation

In the illustrative MVS implementation, the Transport Mechanism installs itself as a subsystem under MVS in accordance with the usual SSI procedures. The Transport Mechanism calls the GETMAIN service routine to obtain storage in the system queue area (SQA) for the control block necessary to identify the Transport Mechanism to the operating system as a subsystem. This control block, known as the subsystem control table (SSCT), is initialized by the Transport Mechanism and queued to the end of the SSI's existing SSCT queue using compare-and-swap logic (or through the alternative method of SSCT creation documented in the IBM publication GC28-1149, "MVS/Extended Architecture Systems Programming Library: Initialization and Tuning").

The Transport Mechanism also creates a SSI-standard subsystem vector table (SSVT) whose address is pointed to by the SSCT. The SSVT contains formatted information concerning which types of computer-environment events are to result in an SSI call to a designated Transport Mechanism routine. The Transport Mechanism calls the GETMAIN service routine to obtain storage in the extended common storage area (CSA) for the SSVT. The SSVT is initialized with control fields and vectors necessary for the Transport Mechanism to navigate its control blocks and processing routines, in accordance with standard MVS procedures. The SSVT is queued from the previously installed SSCT using compare-and-swap logic.

In calling the GETMAIN routine, the Transport Mechanism requests sufficient space not only for the "base" SSVT defined by the SSI protocol, but for an extension to the SSVT as well. As the Transport Mechanism operates, as described below, it writes information to this extension space concerning its own allocation of memory resources during the sequential calling of the SUPERVISOR PROGRAMs. If the unblocked execution of the normal IH routine would have resulted in an abnormal termination ("crash") of the program initiating the SVC (referred to herein as a user program), the Transport Mechanism uses this information for releasing allocated memory back to free storage. Writing this information to a control-block extension, instead of to a separate control block, is advantageous because it requires only one call for an allocation of storage, thus reducing the software maintenance burden.

The Transport Mechanism calls the operating system's MSTR subsystem using the IEFSSREQ service routine to ensure that the SSCT can be recognized by the SSI routines. An SSOB, located in the Transport Mechanism's private storage area, is provided to the IEFSSREQ service and requests verification of the subsytem to be used for the Transport Mechanism. Successful completion of the service indicates that the Transport Mechanism is properly installed.

MVS SUPERVISOR PROGRAM Installation

In the illustrative MVS implementation, each SUPERVISOR PROGRAM, like the Transport Mechanism, installs itself as an MVS subsystem using standard SSI procedures. The SUPERVISOR PROGRAM additionally is designed to use the GETMAIN service routine to acquire storage for an extended interrupt screening table (XST) unique to that SUPERVISOR PROGRAM.

The SUPERVISOR PROGRAM initializes the XST with formatted information about the types of SVCs which will be processed by the SUPERVISOR PROGRAM, and additionally about the addresses of the SUPERVISOR PROGRAM's own interrupt-handling (SPIH) routines for processing particular types of SVCs. The XSTs for all active SUPERVISOR PROGRAMs are queued, as described below, and their information is used by the Transport Mechanism's DISPATCHER routine in the sequential calling of SUPERVISOR PROGRAMs in response to an SVC event.

Normally, one XST is created per SUPERVISOR PROGRAM, containing information about all types of SVCs that will be processed by the SUPERVISOR PROGRAM. However, the Transport Mechanism's queue-oriented method of processing XSTs, described below, permits a SUPERVISOR PROGRAM to create and queue a plurality of XSTs.

Such a plurality of XSTs may be useful, e.g., if a SUPERVISOR PROGRAM is to be called more than once in response to a given type of SVC (e.g., both prior to any other SUPERVISOR PROGRAM and after all other SUPERVISOR PROGRAMs as well). As another example, a SUPERVISOR PROGRAM might include a decision branch, one outcome of which is a determination that an additional type of SVC must be processed whenever the new type of SVC is subsequently initiated. In such an instance, an additional XST may be created and queued in the ordinary manner. In most MVS systems there will be no serious limitation to the number of XSTs which may be installed in the Transport Mechanism's XST queue.

Three different SPIH routine addressing methods are available under MVS, respectively utilizing the direct address of the routine, the indirect address (the prefered method for maintenance and other purposes), or an address making use of the MVS "Program Call" facility. Only one addressing method can be used in a single XST because of MVS system constrains, as will be appreciated by those of ordinary skill having the benefit of this disclosure. However, multiple XSTs associated with one SUPERVISOR PROGRAM may utilize different addressing methods.

After creating its XST(s), the SUPERVISOR PROGRAM installs itself as a user of the Transport Mechanism's DISPATCHER routine facilities by installing its XST on the Transport Mechanism's queue of XSTs. The SUPERVISOR PROGRAM initializes an SSIB/SSOB control block pair in the SUPERVISOR PROGRAM's private address space. The SSIB/SSOB pair is passed to the SSI, and through the SSI to the Transport Mechanism (also a subsystem), by an IEFSSREQ call from the SUPERVISOR PROGRAM. Such use of the SSI obviates the need for SUPERVISOR PROGRAMs to have preexisting knowledge of the Transport Mechanism's control block structure in order to gain access to the Transport Mechanism's installation routine.

The MVS Transport Mechanism's SUPERVISOR PROGRAM installation routine processes the specific initializing information written to the SSIB/SSOB pair; the processing includes performing any desired validation checks. The initializing information includes the queue position desired by the SUPERVISOR PROGRAM for the XST. If the XST passes all validation checks, the SUPERVISOR PROGRAM is queued in the Transport Mechanism's queue of active SUPERVISOR PROGRAMs.

If desired, the Transport Mechanism's queue positioning scheme may be set up in priority classes, with XSTs being queued in order of their priority class and within each class in order of installation.

The SUPERVISOR PROGRAM's invocation of SSI subsytem installation procedures results in the creation of an SSCT and associated SSVT for the SUPERVISOR PROGRAM, as described above in connections with the Transport Mechanism. Like the Transport Mechanism, the SUPERVISOR PROGRAM is programmed to request sufficient space for an extension to its SSVT. For convenience, this extension space is used by the SUPERVISOR PROGRAM to write formatted information about the kinds of environment-state information to be looked up by the SUPERVISOR PROGRAM's SPIH routines. For example, the SPIH routine might find out from the information in the SSVT extension that the SPIH routine is to make use of the state of certain registers to determine the terminal ID number associated with the user program which initiated the SVC.

MVS SUBSTITUTE IH Installation

In the illustrative MVS implementation, the Transport Mechanism's SUBSTITUTE IH installation routine is called in connection with the installation of a new SUPERVISOR PROGRAM's XST. The routine makes use of the standard SVC-UPDTE feature of the MVS operating system.

The Transport Mechanism utilizes the information written into the new XST by the SUPERVISOR PROGRAM being installed to determine which types of SVCs will be processed by that SUPERVISOR PROGRAM. For each such SVC type, the Transport Mechanism consults a table of interceptable SVC types which it maintains to determine whether the corresponding SVCTABLE entry has already been overwritten with the address of the Transport Mechanism's own corresponding SUBSTITUTE IH routine.

Purely as a matter of convenience, this Transport Mechanism table is maintained within the addressable storage allocated for a CONTROL-SVC interrupt handling routine, which itself is utilized by the illustrative MVS Transport Mechanism as a security measure. This table also contains the saved addresses of the normal IH routines for the supervised interrupts.

The table is created during installation of the Transport Mechanism, which installs the address of a CONTROL-SVC IH routine into the SVCTABLE by overwriting an existing SVCTABLE entry using the SVCUPDTE function (thus sacrificing the operating system's SVC that was originally pointed to by that SVCTABLE entry). The entry to be overwritten is selected by the user during installation of the Transport Mechanism, preferably from the user SVC range (SVCs no. 200-255 inclusive), described in IBM publication GC28-1150-2. The CONTROL-SVC routine operates in conjunction with the Transport Mechanism's INTERRUPT EXECUTION routine as described below.

To reduce the chance of integrity problems, the CONTROL-SVC routine is preferably designed immediately to return control to the calling program, without executing the SVC, if a precise protocol (e.g., a password or a special parameter list) is not used in making the call. With such a protocol requirement, other programs that happen to call the CONTROL-SVC, by accident or otherwise, will not cause unexpected results.

If the SVCTABLE entry for the SVC to be supervised has not already been overwritten, the Transport Mechanism causes such an overwrite using the SVCUPDTE function and notes that fact in the CONTROL-SVC table. Otherwise, the SUBSTITUTE IH installation routine returns control to the calling program.

Calling of MVS ENVIRONMENT MODELLER Routine

In the illustrative MVS implementation, when an SVC is initiated by a program, the ENVIRONMENT MODELLER routine makes uses of the SSI's already well-documented SSIB/SSOB protocol in creating a formatted MEMORY MODEL, thus easing the task of writing SUPERVISOR PROGRAMs for those familiar with that protocol. (A separate BACKUP MODEL is not used in the MVS implementation because the MVS system's supervisor request block (SVRB) and other well-known control blocks adequately provide the required information.)

Upon initiation of an SVC, the ENVIRONMENT MODELLER routine acquires addressable storage using the GETMAIN service and creates an SSIB and SSOB in standard SSI format. This SSIB, however, is used (during the operation of the DISPATCHER routine) to identify the SUPERVISOR PROGRAM being called instead of identifying the calling program as would normally be done in the SSI protocol. The control blocks, registers, and other fields copied by the ENVIRONMENT MODELLER routine are defined in the IEFJSSIB SSIB and IEFJSSOB members of the SYS1.MACLIB data set included with the MVS operating system.

The Transport Mechanism-written SSOB points to the address of the MEMORY MODEL, which is an extension block created and written to by the ENVIRONMENT MODELLER routine and is referred to as an extended supervisor table (SXSS). As written by the ENVIRONMENT MODELLER routine, the SXSS includes an extensive description of the environment-state information associated with the SVC event that has occurred, e.g., the values of certain registers. This description includes information from the SVRB, which those of skill will recognize is created by the operating system in response to the issuance of the SVC by the initiating program. The values of both the program-status-word (PSW) and general registers which existed at the time the SVC was issued are copied into the SXSS, as are the addresses of both the task control block (TCB) and the SVRB. The specific control blocks, registers, etc., to be copied are defined in the IKJTCB and IHARB macros of the SYS1.AMODGEN data set included with the MVS operating system.

In addition, the address of the Transport Mechanism's INTERRUPT EXECUTION service routine is placed into the SXSS to give the SUPERVISOR PROGRAMs a convenient means for requesting execution of the called interrupt if desired.

Calling of MVS DISPATCHER Routine

In the illustrative MVS implementation, the DISPATCHER routine checks a flag at an SVC-specific offset in each XST to determine whether or not to call the corresponding SPIH, whose address is also contained at an SVC-specific offset in the SVC. As a result, some SUPERVISOR PROGRAMs (whose flags are set OFF) may not be called in response to a given type of SVC.

The programming of each SUPERVISOR PROGRAM's SPIH routine is arbitrary and can include direct manipulation of the MEMORY MODEL (as opposed to manipulation through calling of Transport Mechanism service routines). In the illustrative implementation being described, it has been found that direct manipulation is preferable because of the relative infrequency of manipulation and the complexity of designing such service routines for all possible SVCs. With direct manipulation, only those SVCs being supervised need be accounted for, and the programming for the manipulation can be deferred until the design stages of a SUPERVISOR PROGRAM which will conduct such manipulation.

Calling of MVS INTERRUPT EXECUTION Routine

When the Transport Mechanism's INTERRUPT EXECUTION routine is called by a SUPERVISOR PROGRAM, that routine initiates a CONTROL-SVC interrupt event in accordance with the required protocol described above. Upon initiation of the CONTROL-SVC interrupt, the MVS operating system routinely creates a separate SVRB containing program status information about the interrupt event, just as it did when the user program initiated the supervised interrupt. The arguments passed to the CONTROL-SVC interrupt handler include (a) a pointer to the specific address of the supervised SVC's normal IH routine, and (b) a pointer to the SXSS.

The CONTROL-SVC interrupt handler in turn (1) performs data-writing operations as necessary to conform the environment to the status reflected in the MEMORY MODEL (i.e., the SXSS); and (2) calls the supervised SVC's normal IH routine.

Upon completion of the normal IH routine for the supervised SVC, control subsequently returns to the CONTROL-SVC interrupt handler, which updates the SXSS to reflect the current (post-execution) state. Control is then passed back to the Transport Mechanism's INTERRUPT EXECUTION routine which called the CONTROL-SVC routine, and ultimately back to the SUPERVISOR PROGRAM which called the INTERRUPT EXECUTION routine.

The normal interrupt handler for the supervised SVC is thus finally called. However, the environment may have been considerably altered from the time when the SVC was originally initiated. Furthermore, the normal IH's return is not to the user program which originally called it, but to the CONTROL-SVC interrupt handler, and in turn to the INTERRUPT EXECUTION routine, and again in turn to the calling SUPERVISOR PROGRAM.

In effect, therefore, the Transport Mechanism's INTERRUPT EXECUTION routine has caused execution of the SVC, called by the user program, under its (the Transport Mechanism's ) own control, and within an environment specified by its SXSS (which may have been intentionally modified by a SUPERVISOR PROGRAM), before returning control to the calling SUPERVISOR PROGRAM for further action.

The Transport Mechanism's INTERRUPT EXECUTION routine is preferably distinct from the CONTROL-SVC IH routine that actually causes the execution of the SVC. As noted above, for integrity reasons the CONTROL-SVC IH routine can be designed to require conformance with a protocol for normal-IH routine execution to result. In fact, some computer-system administrators may prefer not to divulge the details of the protocol, thus requiring designers of SUPERVISOR PROGRAMs to use the INTERRUPT EXECUTION service routine, which can have additional security measures or error-trapping features as desired.

In the illustrative MVS implementation, a BACKUP MODEL is not necessary. This is because a separate SVRB, distinct from that of the calling program, is written by the operating system as a matter of course when the INTERRUPT EXECUTION routine initiates the CONTROL-SVC interrupt to execute the normal IH routine. Likewise, distinct PSWs and other control blocks are also written for the CONTROL-SVC interrupt. This leaves unchanged, and available for reference, the control blocks originally written by the user program which initiated the SVC event.

The illustrative MVS Transport Mechanism returns control to the calling user program using standard MVS register-restoration protocols. These protocols are documented in at pages 191-196 of IBM's aforementioned technical reference GC28-1150-2.

It will be appreciated by those skilled in the art having the benefit of this disclosure that this invention is believed to be capable of application in a wide variety of other situations. Accordingly, this description is to be construed as illustrative only and as for the purpose of teaching those skilled in the art the manner of carrying out the invention.

For instance, it will be apparent to those of ordinary skill having the benefit of this disclosure that a SUPERVISOR PROGRAM can be designed to take virtually any kind of action when called by the Transport Mechanism. For a given type of interrupt event, a SUPERVISOR PROGRAM could have a complex logic and a set of available actions that would be be determined by various factors, or combinations of factors, in the environment status.

As a hypothetical example, a SUPERVISOR PROGRAM which supervises disk-drive data writing operations could conceivably be designed to intercept all requests for such operations originating from certain terminals, but not from other terminals. Data being written to disk under the control of such terminals could then be processed through an encryption algorithm. Through manipulation of the MEMORY MODEL's address registers and other information, the data actually written to disk could be the stored output of the encryption algorithm in lieu of the original unencrypted data. The use of the MEMORY MODEL environment data as a central reference point thus gives a SUPERVISOR PROGRAM considerable flexibility.

Furthermore, the environment status information stored in the MEMORY MODEL and/or BACKUP MODEL can be a valuable aid to debugging in the event of an abnormal termination of a user program or of the operating system itself.

It is also to be understood that the form of the invention shown and described is to be taken as the presently preferred embodiment. Various modifications and changes may be made without departing from the spirit and scope of the invention as set forth below in the claims. It is intended that the following claims be interpreted to embrace all such modifications and changes.

What is claimed is:

1. An improved method, performed by a computer system executing a set of program instructions referred to as a transport-mechanism program, of processing an interrupt, wherein (i) said interrupt is generated by a user program executing in an operating environment of said computer system, (ii) said operating environment comprises one or more control blocks and one or more registers each having respective information contents that can be changed by said computer system in response to events occurring within said computer system, (iii) said operating environment has a state defined by said information contents, and (iv) said computer system has a memory in which a normal interrupt handling routine for processing said interrupt is stored; said method comprising:

(a) creating, in addressable storage, a memory model of said operating environment by copying the information contents of one or more said control blocks and of one or more of said registers to said addressable storage;

(b) setting a flag to indicate that the normal interrupt handling routine has not been executed;

(c) calling each of a plurality of supervisor programs in said computer system, referred to as polling said supervisor programs, each said supervisor program being configured to test whether the normal interrupt handling routine has been executed prior to attempting to call the normal interrupt handling routine, wherein each calling of a supervisor program includes:

(1) passing execution control of the computer system to said supervisor program;

(2) in response to any said supervisor program testing whether the normal interrupt handling routine has been executed and if not, then issuing a request to the transport mechanism program to call the normal interrupt handling routine:

(A) invoking the execution of an interrupt-execution routine, and (B) returning control to said supervisor program;

(3) said interrupt-execution routine including:

(A) determining whether the memory model still matches the state of the operating environment and if not, then altering the operating environment to a state that conforms to said memory model, (B) calling the normal interrupt handling routine, (C) updating the memory model to reflect any changes to the operating environment that occurred as a result of calling the normal interrupt handling routine, and (D) resetting said flag to indicate that the normal interrupt handling routine has been called;

(d) after said polling of said supervisor programs, determining whether said flag indicates that the normal interrupt handling routine has been called, and if not then:

(1) determining whether the memory model still matches the state of the operating environment and if not, then altering the operating environment to conform to said state, and (2) calling the normal interrupt handling routine; and (e) returning execution control of the computer system to said user program.

2. The method of claim 1, wherein said polling of said supervisor programs occurs in an order determined by a priority scheme in which a priority is assigned to each said supervisor program.

3. A program storage device that is readable by the computer system of a specified one of claims 1 or 2, said program storage device having encoded therein a program of instructions that includes instructions for executing the method steps of said specified one of claims 1 or 2.

* * * * *